United States Patent [19]
Borowski

[11] 3,997,841
[45] Dec. 14, 1976

[54] TIME DOMAIN EQUALIZER FOR BROADBAND COMMUNICATION SYSTEMS

[75] Inventor: Wolfgang Borowski, Markgroningen, Germany

[73] Assignee: International Standard Electric Corporation, New York, N.Y.

[22] Filed: Sept. 23, 1975

[21] Appl. No.: 615,956

[30] Foreign Application Priority Data
Oct. 8, 1974 Germany .......................... 2447930

[52] U.S. Cl. ................................ 325/42; 333/28 R
[51] Int. Cl.² ......................................... H03H 7/36
[58] Field of Search ............ 325/65, 320, 42, 473, 325/321, 323, 324; 333/18 R, 28, 17, 18

[56] References Cited
UNITED STATES PATENTS

| | | |
|---|---|---|
| 3,283,063 | 11/1966 | Kawashima et al. ................. 333/18 |
| 3,745,463 | 7/1963 | Klein ................................... 333/28 |
| 3,868,576 | 2/1975 | Bagdasarjanz et al. ............... 333/28 |

Primary Examiner—Benedict V. Safourek
Attorney, Agent, or Firm—John T. O'Halloran; Thomas M. Marshall

[57] ABSTRACT

If a time domain equalizer with capacitive-resistive voltage dividers for adjusting the level of the individual time-delayed partial signals as commonly employed for high frequencies is to be used to equalize broad communication bands, the noise requirements for the lower communication band cannot be satisfied because of the frequency response of the voltage dividers. This effect is reduced by adding to the signal to be corrected, besides the signals delayed by n.τ, at least one signal delayed by τ/m.

2 Claims, 2 Drawing Figures

TIME DOMAIN EQUALIZER FOR BROADBAND COMMUNICATION SYSTEMS

BACKGROUND OF THE INVENTION

Time domain equalizers for broadband communication systems with a delay line having several taps which are displaced from each other by a time difference $\tau$ corresponding to a half cycle of the upper cutoff frequency of the signal to be corrected, wherein echos delayed by integral multiples of $\tau$ and tapped off from the taps of the delay line and adjusted in level by means of voltage dividers formed from differential-capacitor plates and low input resistances are vectorially added to or subtracted from the signal to be corrected, which is coupled out via a capacitor, wherein the signal obtained in this way is then amplified, and wherein the frequency response resulting from the use of the voltage dividers is corrected, are known from German printed application No. 2,135,213.

During work on a time domain equalizer for a 10,800 channel-carrier-frequency system, which occupies a frequency band from 4 to 60 MHz, it turned out that such a time domain equalizer could not be realized for this frequency band.

SUMMARY OF THE INVENTION

It is the object of the invention to provide a time domain equalizer which is also usable for broad frequency bands containing such high frequencies. The manner in which this object is obtained is apparent from the claims.

Advantages

The advantages of the time domain equalizer in accordance with the invention are that sufficient noise suppression can be achieved, that it permits the use of a low-noise amplifier with sufficient control range as commonly used for this frequency band, and that the problem of correct addition and subtraction of the individual reflected signals can be solved satisfactorily from a technical point of view.

DESCRIPTION OF THE PREFERRED EMBODIMENT

Figure 1:
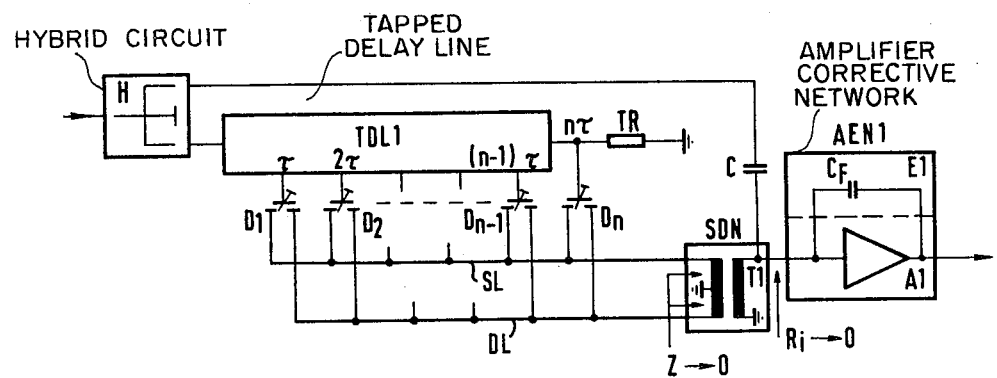

The invention will now be described in more detail with reference to the accompanying drawing, showing, by way of example, a preferred embodiment of the invention. In the drawing, FIG. 1 shows the time domain equalizer disclosed in German printed application No. 2,135,313, and FIG. 2 shows the time domain equalizer in accordance with the invention.

Figure 2:
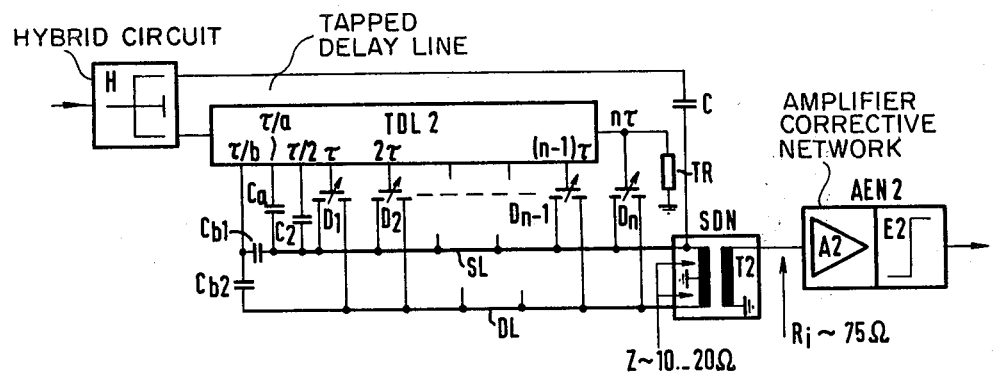

The known time domain equalizer shown in FIG. 1 corresponds to the one shown in FIG. 2 of German Printed application No. 2,135,213. It contains a tapped delay line designated by TDL 1, with the delay between two successive taps being $\tau$, which corresponds to a half cycle of the upper cutoff frequency of the signal to be corrected. The signal to be corrected is applied through the bidirectional branch and through the appropriate unidirectional branch of a hybrid circuit H to the input of the delay line TDL 1, whose output is terminated in a resistance TR corresponding to the characteristic impedance Z of the delay line. Reflected signals delayed by $\tau, 2\tau, \ldots (n-1)\tau$ are tapped from the taps of the delay line TDL 1, and reflected signals delayed with respect to the input signal by $n\tau$ are taken from the output of the delay line. These reflected signals are each applied to the rotor of a differential capacitor D1 ... Dn. One stator of each of these differential capacitors is connected to a bus SL, and the other stators are connected to a bus DL, with SL connected to the adding input, and DL to the subtracting input, of a sum-difference network SDN. From the other unidirectional branch of the hybrid circuit H, the signal to be corrected is applied without delay through a capacitor C to the sum-difference network SDN, where the difference formed from the reflected signals of the bus SL and from those of the bus DL is added to it. The hybrid circuit H prevents the echos applied to the busses SL and DL from travelling through the capacitor C back to the input of the delay line.

In the present case, the sum-difference network SDN is a differential transformer T1 through which the input resistance of the amplifier A1 of a following amplifier corrective network AEN 1, which input resistance tends to 0, is coupled in as the low-end voltage-divider impedance for the differential-capacitor plates between the busses SL, DL and ground. The voltage dividers formed in this way from a capacitor and a low-value resistor in series do not only have a high division factor; they are also frequency-dependent, so the following amplifier corrective network AEN1 must not only provide a relatively high gain, but also equalize the frequency response caused by the voltage dividers.

In the example shown, this is done by connecting a suitably frequency-dependent element E1 in the form of a capacitor $C_F$ into the feedback loop of an amplifier. Thus, a strictly speaking, linear amplifier A1 and a frequency-dependent equalizing element E1 are present in this case, too.

During work on a time domain equalizer for a useful frequency band of 4 to 60 MHz, it turned out that this time domain equalizer was not realizable for this frequency range. An amplifier in which frequency-dependent shunt feedback is applied to the input has no constant input impedance over a wide frequency range, but its input impedance is frequency-dependent itself. In the present case, it increases with decreasing frequency. Although the resulting reduction in the frequency response of the voltage dividers is desirable, because the amplifier then requires less gain for the low frequencies, an increase in the input resistance of the amplifier with decreasing frequency necessitates busses SL and DL whose characteristic impedances are frequency-dependent in the same sense in order that no undesirable echoes are caused on the busses SL and DL by reflections; these echoes would make a correct addition and subtraction of the reflected signals impossible. Such busses are not realizable, however.

The realization of an amplifier with so strongly frequency-dependent shunt feedback and a gain increasing toward low frequencies also presents problems because at such high frequencies no sufficient stability can be achieved because of the unavoidable self-capacitances and self-inductances of the components and circuit boards used. A substantial portion of the noise suppression achieved by the low reflected-signal-source impedance, which is equal to the low-end voltage-divider impedance, is lost again as the high division factors at low frequencies require correspondingly high amplification factors which entail corresponding noise. Furthermore, the strong frequency dependence of the amplifier narrows the amplifier's workable control range.

For these reasons, a different approach has to be adopted for the time domain equalizer according to the invention, shown in FIG. 2. The amplifier corrective network AEN 2 used here consists of a linear, low-noise amplifier A2 with a 75 Ω input and output as commonly used for this frequency range and as can also be employed for this range at many other points of a carrier-frequency system, and of a following frequency-dependent element E2 which, in this case, performs the function of a de-emphasis network. The sum-difference network SDN again consists of a differential transformer T2 which transforms the 75Ω input resistance of the amplifier A2 to a value in the range from 10 to 20Ω and couples in this value as the low-end impedance of the voltage dividers between the busses SL, DL and ground. Busses SL and DL with an impedance value between 10 and 20Ω with respect to ground can be realized for the specified frequency range and also for higher frequences as microstrip lines using circuit board technology. In this case, the isolation between the individual delay-line taps is still sufficient at this low-end impedance of the individual voltage dividers.

Although the voltage dividers have a low division ratio because of the low-end impedance being higher (10 to 20 Ω) than in the arrangement of FIG. 1, this division ratio is still so high that the low frequency components of an echo at the divider output, i.e., at the bus, has such low level values as to lie too close to the existing noise, so the required signal-to-noise ratio cannot be met. Therefore, the signal levels at the amplifier input, and mainly those of the low signal components, must be raised so that their values comply with the required distance from the noise level, which is mainly given by the amplifier noise. Hence, correcting means must be used to effect a self-compensation of the time domain equalizer. According to the invention, this self-compensation is effected by adding to the signal to be corrected, besides the echoes delayed by integral multiples of $\tau$, at least one echo delayed by fractions of $\tau$.

To this end, the delay line TDL 2 of FIG. 2 has, in addition to the taps $\tau$.... $(n-1)\tau$, taps at fractions of $\tau$, of which the taps $\tau/a$ and $\tau/b$ are shown by way of example. $a$ and $b$ are integers greater than 1. By this measure, the time domain equalizer's frequency-dependent fundamental attenuation, which is caused by the coupling-out of the signal by means of the capacitor C and by the Z of the bus SL as the low-end voltage-divider impedance, can be considerably reduced, thereby improving the signal-to-noise ratio. The measure of this improvement is also dependent, to a certain extent, on the number of echos delayed by fractions of $\tau$. Since this self-compensation affects only those properties of the time domain equalizer which are design-dependent and remain unchanged during a production series, it is not necessary to provide any adjusting means as in the case of the echos delayed by $\tau$.... $n\tau$, but the adjustment is effected once during the design of the circuit; thus, the differential capacitors can be replaced by fixed capacitors as is shown in FIG. 2.

Experiments have shown that a sufficient improvement in noise suppression can already be achieved if, instead of a large number of echos delayed by fractions of $\tau$, only a single echo delayed by $\tau/2$ is applied to the bus SL. In FIG. 2, therefore, the tap $\tau/2$ with the associated coupling-out capacitor $C_2$ is shown separately.

What is claimed is:

1. A time domain equalizer device for broadband communication systems having delay line means including several taps displaced from each other by a time difference corresponding to a half cycle at the upper cutoff frequency of the signal to be corrected comprising: means for delaying the echos of the signal to be corrected by integral multiples thereof tapped off from said taps; echo adjusting voltage divider means formed from differential-capacitor plates and low input resistances for vectorially adding to or subtracting from said signal to be corrected; means coupling out the corrected signal including a capacitor; and corrected signal amplifying means whereby the frequency response resulting from said voltage divider means is corrected, said delay line means including means for delaying at least one echo by fractions of $\tau$ and adding said delayed echo to said signal to be corrected.

2. The time domain equalizer device of claim 1 further including additional means for delaying an echo by $\tau/2$ associated with a separate tap to said delay line means and means for adding the resultant signal to said signal to be corrected.

* * * * *